(12) United States Patent
Cheston et al.

(10) Patent No.: US 6,195,695 B1
(45) Date of Patent: Feb. 27, 2001

(54) DATA PROCESSING SYSTEM AND METHOD FOR RECOVERING FROM SYSTEM CRASHES

(75) Inventors: Richard W. Cheston, Morrisville; Howard Locker, Cary; David B. Rhoades, Apex, all of NC (US)

(73) Assignee: International Business Machines Corporation

( * ) Notice: Subject to any disclaimer, the term of this patent is extended or adjusted under 35 U.S.C. 154(b) by 0 days.

(21) Appl. No.: 09/181,138

(22) Filed: Oct. 27, 1998

(51) Int. Cl.[7] .................................................. G06F 15/177
(52) U.S. Cl. .......................... 709/221; 709/201; 709/203; 709/212; 709/217; 709/248; 707/200; 707/202; 707/204; 711/161; 711/162; 714/2; 714/6
(58) Field of Search .................................... 709/201–203, 709/212–213, 217–222; 711/248, 100, 161–162; 713/200–201; 707/200–205, 10; 714/1–8

(56) References Cited

U.S. PATENT DOCUMENTS

| | | | |
|---|---|---|---|
| 5,375,232 | * 12/1994 | Legvold et al. | 707/200 |
| 5,375,240 | * 12/1994 | Grundy | 713/200 |
| 5,381,545 | * 1/1995 | Baker et al. | 707/202 |
| 5,390,335 | * 2/1995 | Stephan et al. | 709/221 |
| 5,745,905 | * 4/1998 | Larsson et al. | 707/203 |
| 5,802,297 | * 9/1998 | Engquist | 709/212 |
| 5,845,082 | * 12/1998 | Marakami | 709/226 |
| 5,857,208 | * 1/1999 | Ofek | 707/204 |
| 6,035,412 | * 3/2000 | Tamer et al. | 707/204 |
| 6,101,497 | * 8/2000 | Ofek | 707/10 |

* cited by examiner

Primary Examiner—Ahmad F. Matar
Assistant Examiner—Bharat Barot
(74) Attorney, Agent, or Firm—George E. Grosser

(57) ABSTRACT

A system and method for recovering from corruption of an executable application and/or operating system stored on a client computer without downloading another copy of the application and/or operating system. This recovery is accomplished by storing, preferably at the initial program loading, two copies of the application (and the operating system, if desired) in different segments of a partitioned storage, one copy as a working copy and a second copy as an archive or backup copy. When the working copy of the application or operating system becomes corrupted and crashes, the backup copy is thereafter used as the new working copy and, if desired, a new backup copy is stored to be used when the working copy crashes. This allows the system to continue functioning after a crash without the necessity to find a new copy of the application and operating system from outside the computer.

14 Claims, 3 Drawing Sheets

DATA PROCESSING SYSTEM AND METHOD FOR RECOVERING FROM SYSTEM CRASHES

FIELD OF THE INVENTION

The present invention relates to a system and method for recovering from a personal computer workstation crash resulting from a corrupted application and/or operating system. More particularly, the present invention relates to a personal computer operating in a communication network where the workstation includes an operating system and an executable application and/or operating system and the workstation can recover from a crash resulting from corruption of the application and/or operating system by the operating system without using the communications network to download another copy of the executable application and operating system.

BACKGROUND OF THE INVENTION

One application of a personal computer is as a workstation where an executable application is loaded into the workstation, operating on top of an operating system like Microsoft's Windows. The operator uses the combination of the executable application and the operating system to enter data, such as orders, in response to customer requests, for example, by telephone calls received at a call center. Once the data is entered and verified, the data is typically forwarded from the workstation computer over a communications network to a host computer or server for storage and further processing (e.g., for order fulfillment, billing, service, etc.) driven by the host computer. Typically, a large number of workstations are coupled to a single host or server.

The executable application (and operating system, if desired) in the personal computer may be initially obtained from the server (in a download operation) or copied from transportable media (like a CD ROM or other storage devices such as floppy diskettes). The executable application (and operating system) randomly and, often without warning, at times become corrupted (and "crash") due to the numerous temporary files which are cached or written during "normal" operation of the executable application and operating system. In such cases, then, the personal computer or client must be turned off, rebooted and another copy of the application program obtained.

Obtaining another copy of the application program (and/or the operating system) from the server after the application or the operating system has become corrupted and crashed takes communication resources, bandwidth which otherwise might be used to communicate data from the other workstations also attached to the server through the network. Frequently, a large number of workstations are all connected to the same server through the communications network and, in the order entry application described above, the primary purpose of the communication network would be for communicating order entry data from each of the workstations up to the server as each order is entered. In its peak operation, the communications from the workstations might take most, if not all, of the capacity of the communication channel, so it would be desirable to avoid extra communications that would be involved in downloading another copy of the executable application (and operating system) if a workstation crashed from a corrupted executable application or operating system.

Alternatively, each workstation might be brought back up (or restarted and reloaded with an uncorrupted copy of the executable application and operating system) after a crash from a separate physical media available at each individual workstation. Two undesirable features relate to having media at each workstation: the cost of distributing and locating the physical media with the executable application and operating system at each of the plurality of workstations and the security of the media from some user removing the media with the executable applications, either inadvertently or as a theft.

Accordingly, the prior art systems for using an executable application and operating system at a workstation in a client-server environment have significant disadvantages and limitations.

SUMMARY OF THE INVENTION

The present invention overcomes the disadvantages and limitations of the prior art systems by providing a personal computer system and method for recovering from a corrupted executable application and/or operating system (and a resulting crash) without having to download a new copy of the executable application and operating system using some of the limited communication channel capacity in the process.

The present system also has the advantage that a media copy of the executable application program and operating system need not be provided for each workstation so that the workstation client can be rebooted and resume operation after a crash without the necessity of a local media copy of the application and operating system.

The present system and method are characterized by a plurality of partitioned storage areas (preferably regions on the hard drive) on the personal computer, with each including a copy of the executable application and operating system copied at the time of initial loading of the application, sometimes called the "image", whether from media or from the network. One of the copies of the executable application and operating system then becomes a "working" copy of the application (which the user employs in processing his data such as the order entry application discussed above) and a second copy becomes a "back-up" (or archive) copy (which is not used normally, but becomes visible and used only after the working copy becomes corrupted and crashes). Then, when the back-up or archive copy becomes visible and becomes used as the working copy, a further copy of the executable application is prepared to serve as a new back-up copy, so that a back-up copy remains available even after the first copy is corrupted and the archive or back-up copy is used as the working copy. Since the back-up or archive copy may be in a partition which is hidden, the operating system does not "see" that part of the storage and does not use that part of the storage for writing temporary files which may cause the back-up or archive copy to be corrupted.

The system of the present invention also has the advantageous feature that it is self-renewing. That is, after the system crashes and before the back-up copy of the application is taken as the working copy, the system and method of the present invention envision that a new archive copy would be made, before the copy that was the back-up copy has a chance to become corrupted.

Another advantage of the present invention is that a stored backup copy can be updated periodically, if desired, and that updating may occur either from the server (in case the executable application needs to be updated for revisions to the executable application) or from the working copy (in case, for example, that data is stored locally and it is desired to have a backup of the stored data). In the case that the updating is from the server downloading a copy of the image, Such updating may be scheduled so as to occur when the data traffic on the communications channel is at a low level, for example, in the middle of the night, or may be available for those times when the traffic is at a reduced level. Thus, for example, a copy of the executable application could be downloaded once a week at 4:00 a.m. on Sunday morning. Alternatively, the system could be programmed to back itself up every evening or once a week, as desired, and then, if the system crashes, the content of the backup copy is no more out-of-date than the time since the last backup. In some applications, it may be desirable to retain backup copies of different period, so you might backup the application with one copy from this past weekend and a second copy from the previous weekend, and then when each backup occurs, to keep the most recent two versions.

Accordingly, the present invention overcomes the disadvantages and limitations of the prior art by providing a workstation system which allows recovery of an executable application and/or operating system after the executable application and/or operating system has been corrupted. This recovery is effected without having to download a replacement copy and without requiring a copy of the application and the operating system in removable media at the workstation.

DETAILED DESCRIPTION OF THE PREFERRED EMBODIMENT

Figure 1:
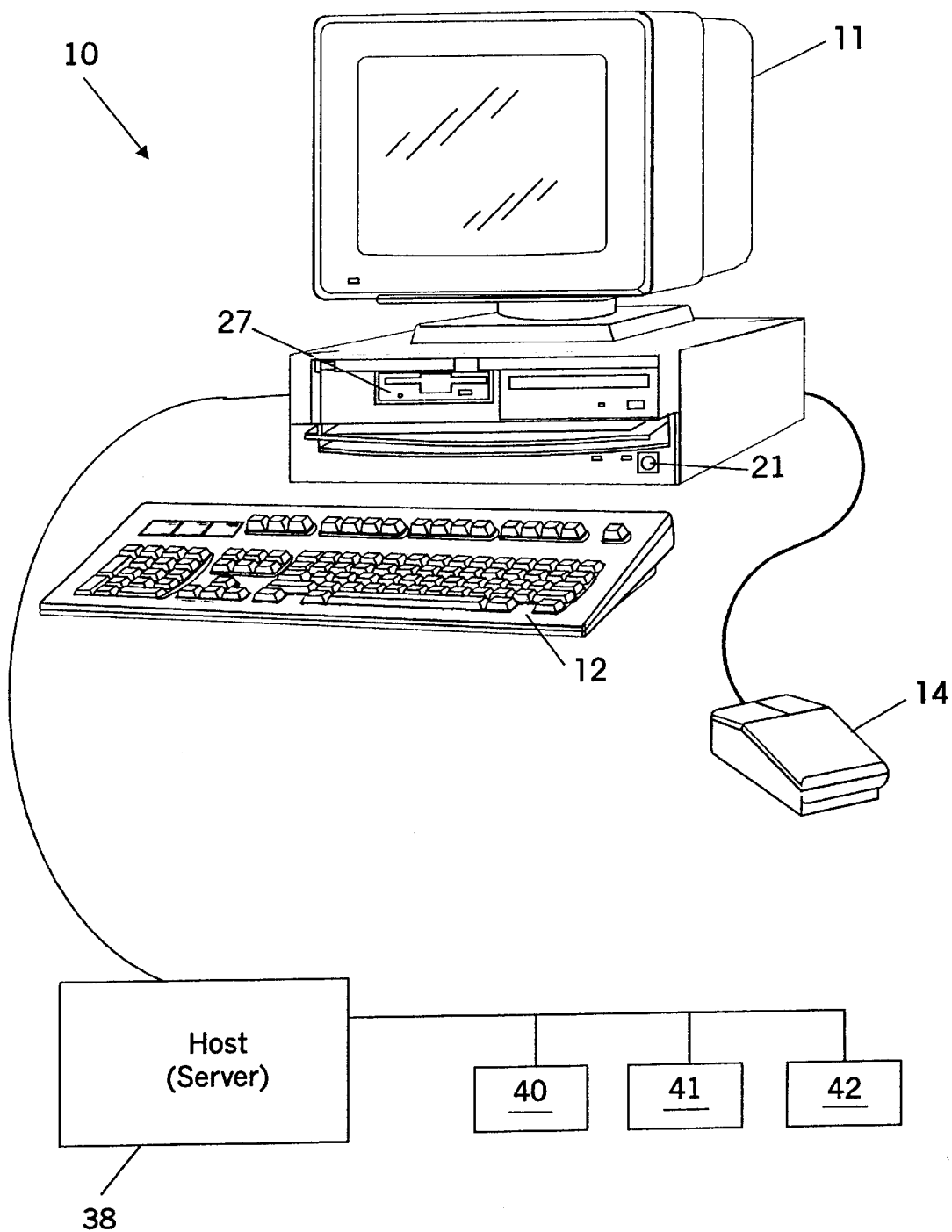
FIG. 1 is a view of a computer network of the type which is useful for using the present invention.

FIG. 1 shows a workstation or personal computer 10 operating as a client computer in a client/server data processing environment. The personal computer 10 is shown with a monitor 11, a keyboard 12, a mouse 14, a floppy drive 27 and a power switch 21. The personal computer 10 also includes within the case a hard drive or storage device (not shown) for storing executable applications (programs), operating system and/or data. This hard drive is of conventional design and is commercially available from any one of a variety of manufacturers and usually would include the capability to partition the storage into a plurality of segments in a conventional and well-known manner. Many hard drives also have indicators to indicate which partitions or areas of the storage are "active" or available for use, and which are "hidden" or not currently available for use.

The personal computer 10 is connected to a host computer or server computer 38 through a communication channel 36. The communications channel would also connect the host computer or server 38 to a plurality of other client computers, shown here by blocks 40, 41, 42. The number of client computers depends on the application and the data processing involved, but could include a large number of clients operatively connected to the host computer 38 through the communications channel 36. The communications channel 36 used in the present invention could be either a local-area-network (LAN), a wide-area-network (WAN) or a radio frequency (RF) communications system of any of a variety of known and conventional designs. In any case, the communications channel may be the limiting factor in how much data is communicated from the client computers to the host and, if the communications channel were also used to bring back up client computers after the images have been corrupted, that additional communications channel traffic could limit the amount of data being sent from the client computers to the host computer.

Figure 2:
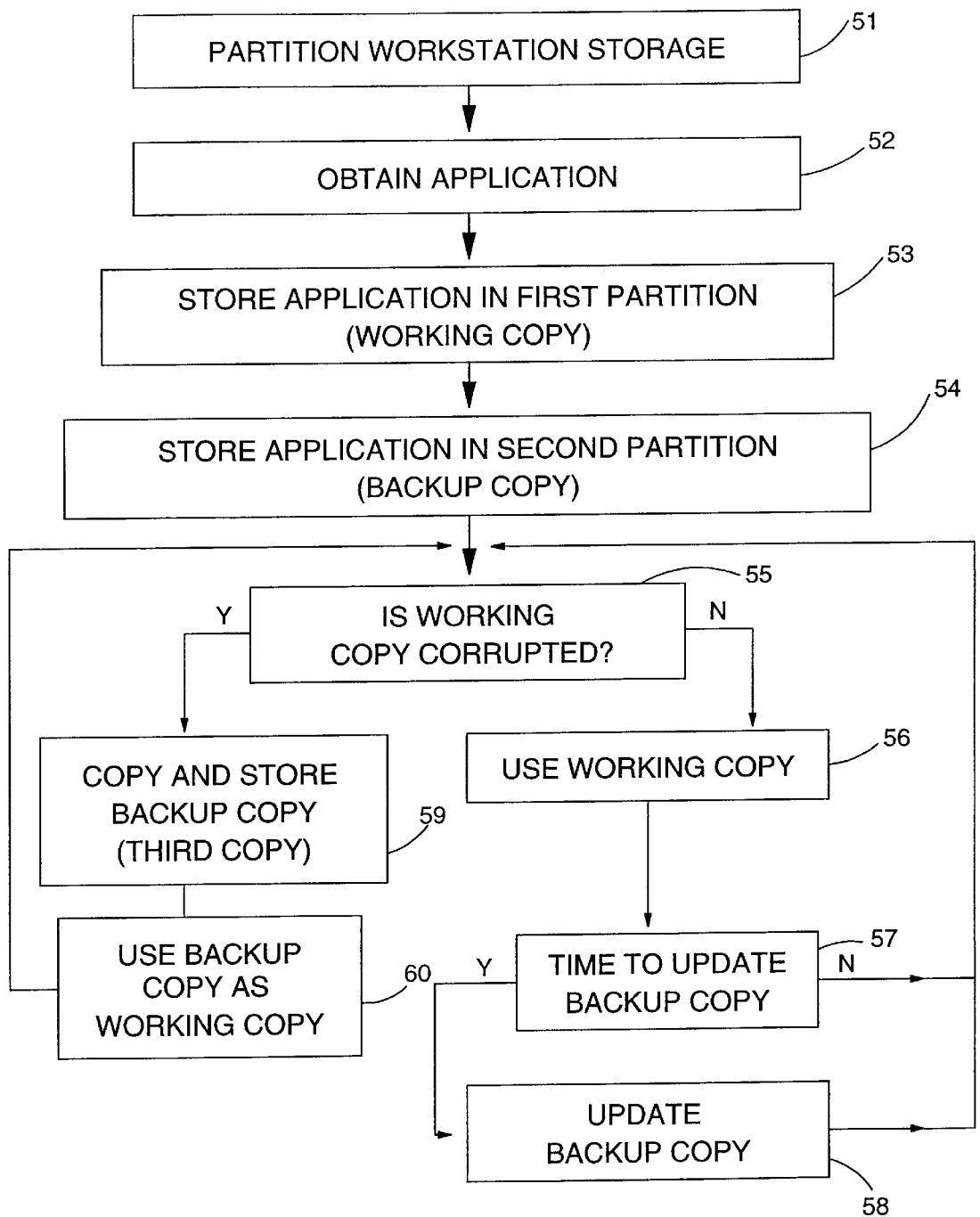
FIG. 2 is a logical flow chart showing the operation of the present invention allow a workstation to recover from system crashes.

FIG. 2 illustrates the logical flow of the present invention in flowchart form. The first step in this process is that the storage (the hard drive discussed with respect to FIG. 1, in its preferred embodiment) is partitioned to be divided into a plurality of different segments at block 51. The executable application (and operating system, if desired) is then obtained at block 52, either by downloading the application from the host or loading it from removable media.

At block 53, a first copy (also referred to as a "working" copy) of the executable application (and, optionally, the operating system) is stored in a first partition and at block 54 a second copy (sometimes referred to as an archive or backup copy) of the executable application and the operating system is stored into a second partition of the storage. At block 55 is a test as to whether the working copy of the application and operating system is corrupted: this test is simple, since current versions of the operating system typically simply "hang" or "crash" and require that the user turn the entire workstation off, then restart the machine, but designs could easily evolve to allow the application and/or operating system to test themselves as to whether either is "corrupted" or not. In any event, if the working copy is not corrupted, then the working copy of the executable application (and operating system) is used, see block 56, for the data processing (i.e. the application might be order entry or word processing or other application, as desired). In block 57, the system tests whether it is time to update the backup copy, a updating which may occur after a predetermined amount of time has passed or after a predetermined amount of data has been accumulated, or because it is a predetermined time (like 4:00 a.m. on Sunday morning when the system usage might be expected to be low, allowing the use of the communications channel for updating). If the backup copy of the application is to be updated, it is updated at block 58, then returns to block 55 to resume the cycle.

If the working copy of the executable application (and operating system) has been determined to be corrupted at the block 55, then at block 59 the backup copy is copied (a third copy), the backup copy becomes the working copy and the third copy becomes the backup copy at block 60, and the data processing resumes at the block 55.

Figure 3:
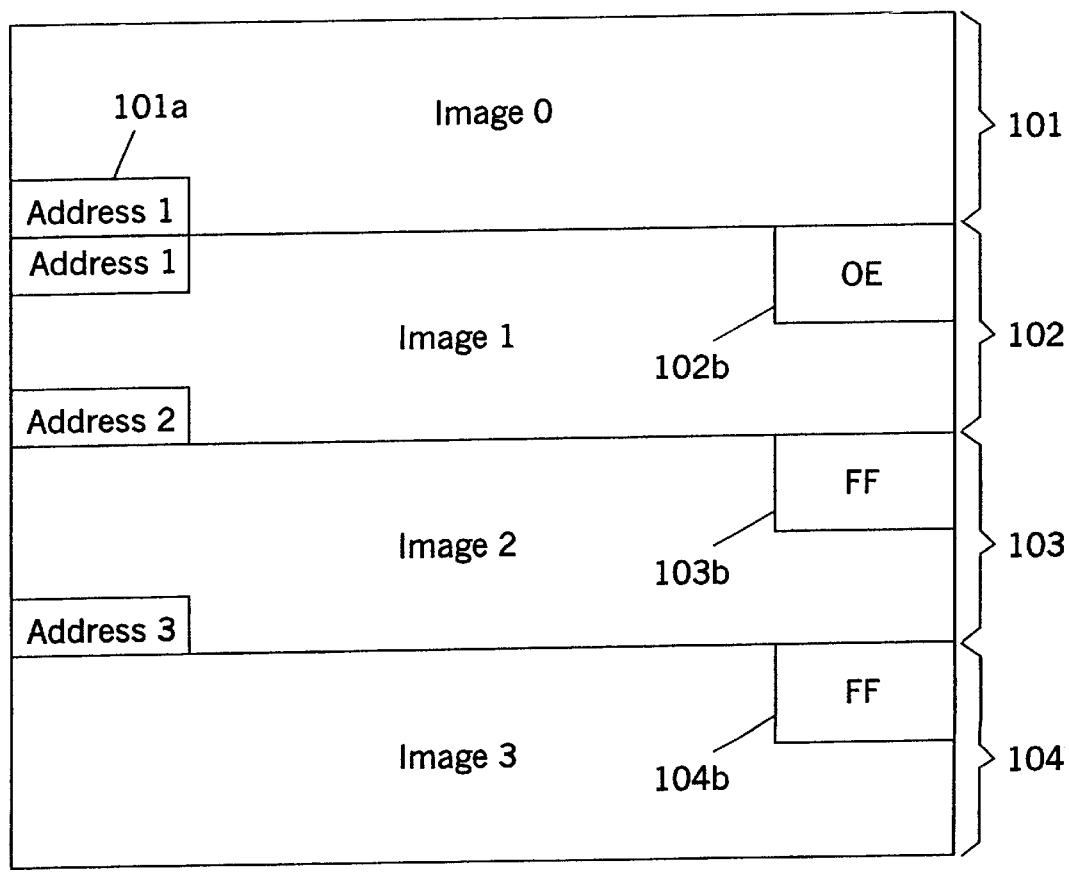
FIG. 3 is a schematic view of the memory of a personal computer in the computer network of FIG. 1, using the present invention.

FIG. 3 illustrates the organization of the workstation storage 100 (the hard drive of the personal computer) as used in practicing the present invention. The storage 100 is partitioned or divided into segments or partitions in a conventional manner, and shown here with four segments or partitions, 101, 102, 103 and 104. When the personal computer is turned on, or boots up, the program always goes to "image 0" segment which is reference number 101. Stored within this image 0 segment is an address of the "working" copy of the application (and operating system, if desired), in this case "address 1", in location 101a. As the executable application is loaded, a copy is put into segment 102 and segment 103 as image 1 and image 2, respectively, located at address 1 and address 2, respectively. Each of the segments 101, 102, 103 also includes an indicator 102b, 103b, 104b, respectively, designating whether the segment is active and visible (by the code OE) or whether the segment is inactive and hidden (indicator "FF").

The current workstation operating systems infrequently, but at randomly and unpredictable occasions, cause the working files on the active segments to become corrupted, causing the system to "crash". Today's applications and operating systems then cease to operate and abort with some kind of message to the user that the system has failed. Once the system crashes, then it is necessary for the operator to turn the workstation off and restart the workstation. When the image 0 is executed, it can prompt the user either to indicate that a crash has occurred or that the backup system is to be used, a function which may require a supervisory password. Once this has been indicated, then the address of the working copy of the executable application (in location 101a) is changed from "address1" to "address2" and the indicator of active or inactive segments is changed, with the indicator 102b for image1 in segment 102 changing from 0E (indicating active) to FF (indicating hidden) and with the indicator 103b for image2 in segment 103b changing from FF (indicating hidden or inactive) to 0E (indicating active). Before processing occurs, however, a copy of the backup copy of the executable application (and operating system, if desired) (image2 in segment 103) is copied as image3 in segment 104 to provide a new backup copy of the executable application (and operating system, if desired), now that the backup copy is to be used as the working copy. The process can continue with new backup copies being made each time that the working copy crashes and the backup copy is to be used as the working copy.

The image from which to boot the workstation after a crash could be indicated by the operator, as described above, with or without a supervisory password. Alternatively, it may be that the host computer (through the network connection) will indicate the copy of the application to use on boot up, based upon the network knowing which copy of the workstation's program has been used and whether the system "crashed" and needs to be started from a different copy of the application and the operating system.

It may be desirable to periodically backup the executable application (and operating system) on the workstation by copying it to replace the existing backup copy, particularly if the working copy changes in response to user input. In some applications, the workstation retains information as it is entered and stores it in the local workstation storage rather than immediately forwarding it to the host computer or server; in these cases, it would be desirable to have a backup copy of that changing data in case the working copy crashes. In other cases, the workstation is used primarily as a data entry device and input data, once entered and verified, is directly moved to the host computer where, as a more substantial processor and a better operating system, presumably, it is subject to better systems for backup and recovery in case of failure.

Some systems are subject to periodic maintenance and updating, either after so many transactions or some much processing or at a fixed time each week. In those cases, then, the executable application (and operating system, if desired) and the backup copy may be refreshed through normal maintenance.

Of course, many modifications can be made to the preferred embodiment without departing from the spirit of the present invention. Those skilled in the art will recognize many changes and adaptations to the present invention based on their knowledge of the capabilities of data processing systems and alternatives, taken together with the foregoing teachings, the appended claims and the accompanying drawings. It is also possible to use some features of the present invention without the corresponding use of other features that were disclosed. For example, a periodic updating of the backup image may be scheduled, either by download from the host computer (preferably at a time when the communication channel is less active with other communications) or from copying the working copy of the application (and operating system, if desired), if the working copy of the application includes data which is updated and stored at the workstation. Accordingly the foregoing description of the preferred embodiment should be considered as merely illustrative of the principles of the present invention and not in limitation thereof, since the present invention is defined solely by the claims which follow.

Having thus described the invention, what is claimed is:

1. A method of processing data at a client computer using an executable application stored on storage at the client computer, where the client computer is coupled to a host computer through a communications channel and has the capability of recovering from a corruption of data at the client computer without downloading another copy of the executable application from the host computer, the steps of the method comprising:

dividing the storage at the client computer into at least two different areas before the executable application is used;

obtaining the executable application and storing a first copy of the executable application in one area of the storage and a second copy in a different area of the storage, the first copy being a working copy and the second copy being an archive or backup copy;

storing an address of the one area of the storage, wherein the first copy of the executable application is stored, in a bootable area of the storage;

booting the client computer system utilizing the bootable area of the storage wherein the first address is stored;

using a copy of the executable application which is stored at the first address as a working copy of the executable application for data processing at the client computer;

sensing corruption of the working copy of the executable application and thereafter storing a second address of the different area of storage wherein the second copy of the executable application is stored;

booting the client computer system utilizing the bootable area of storage wherein the second address is stored; and using the archive or backup copy of the executable application as the working copy, wherein the client computer system can resume processing data after a corruption of the working copy of the executable application without downloading an additional copy of the executable application from the host computer by using the backup or archive copy of the executable application.

2. A method of processing data including the steps of claim 1 and further including the step of making another copy of the archive or backup copy of the executable application before using the archive or backup copy as the working copy so that the client computer continues to have a backup copy of the executable application even after using the backup copy as the working copy.

3. A method of processing data including the steps of claim 2 wherein the step of storing a backup copy of the executable application is performed on a periodic basis.

4. A method of processing data including the steps of claim 1 wherein the method additionally includes the step of marking the area of storage in which the backup or archive copy of the executable application is stored as hidden during the time that the copy is the backup or archive copy of the executable application.

5. A method of processing data including the steps of the method set forth in claim 4 wherein the step of using the backup or archive copy of the executable application also includes the step of changing the designation of that portion of storage from hidden to active.

6. A method of processing data including the steps of the method set forth in claim 2 wherein the step of making another copy of the executable application using the archive or backup copy includes the step of storing that another copy in a region of storage which is marked as hidden.

7. A system for processing data using an executable application at a client computer connected to a host computer through a communications channel and for recovering from a corruption of the executable application at the client computer without downloading an additional copy of the executable application from the host computer after corruption occurs, the system comprising:

the client computer having storage which is divided into a plurality of segments first copy of the executable application being designated as a working copy being used for data processing and being stored in a first area of storage at a first address, and a second copy of the executable application being designated as a backup copy and not normally used for data processing and being stored in a second area of storage at a second address;

means for storing the first address in a bootable area of the storage;

means for booting the client computer system utilizing the bootable area of the storage wherein the first address is stored;

means for using the first copy of the executable application as the working copy;

means responsive to detecting a corruption of the working copy of the executable application as the working copy for designating the backup copy as the new working copy by storing the second address in the bootable area of storage;

means for booting the client computer system utilizing the bootable area of storage wherein the second address is stored;

means for copying the new working copy of the executable application into another section of memory to create a new backup copy of the executable application.

8. A system including the elements as set forth in claim 7 and further including means for marking the region in which the second copy of the executable application is stored as hidden.

9. A system for processing data as described in claim 8 wherein the means responsive to detecting the corruption of the working copy includes means for removing the hidden marking of the region in which the backup copy is stored and marking as active the second of memory wherein the backup copy is stored.

10. A system for processing data of the type described in claim 8 where the system further includes means for marking as hidden the section of memory containing the new backup copy of the executable application.

11. A system of processing data of the type set forth in claim 7 wherein the means for designating the backup copy of the executable application is responsive to a communication from the communications channel.

12. An article of manufacture for controlling the operation of a workstation including storage and a processor for executing an executable application, the article including:

means for segmenting storage of a personal computer into a first and second storage areas;

means for storing a copy of the executable program into the first storage area as a working copy of the executable application and for storing a copy of the executable application into the second storage area as a backup copy;

means for storing a first address of the first storage area in a bootable area of the storage area;

means for booting the personal computer utilizing the bootable area of the storage wherein the first address is stored;

in response to corruption of the working copy of the executable application, means for changing the backup copy to become the working copy of the executable application and for copying the backup copy into an additional copy of the executable application and for storing the additional copy of the executable application in the storage of the data processing system, and means for storing the second address, wherein the backup copy is stored, in the bootable area; and means for booting the personal computer utilizing the bootable area of the storage wherein the second address is stored, wherein the workstation can recover from corruption of the working copy of the executable application without loading a new copy of the executable application from outside the workstation.

13. An article of manufacture of the type set forth in claim 12 further including means for designating the second storage area as a hidden section of the storage.

14. An article of manufacture of the type set forth in claim 13 further including means for removing the designation of the second storage as a hidden section of memory in response to the corruption of the working copy and the backup copy becoming the working copy of the executable application.

* * * * *